United States Patent [19]
Wright et al.

[11] Patent Number: 6,003,196
[45] Date of Patent: Dec. 21, 1999

[54] UPRIGHT VACUUM CLEANER WITH CYCLONIC AIRFLOW

[75] Inventors: Michael F. Wright, Stow; Charles J. Thur, Broadview Heights; Brett Latimer, Mentor; Paul D. Stephens, Cleveland, all of Ohio

[73] Assignee: Royal Appliance Mfg. Co., Cleveland, Ohio

[21] Appl. No.: 09/004,999

[22] Filed: Jan. 9, 1998

[51] Int. Cl.⁶ .................................................. A47L 09/10
[52] U.S. Cl. ............................................. 15/353; 15/347
[58] Field of Search .......................... 15/353, 352, 347; 55/337, 523, 528, 379, DIG. 2, DIG. 3

[56] References Cited

U.S. PATENT DOCUMENTS

| | | |
|---|---|---|
| 2,316,836 | 4/1943 | Breuer . |
| 2,394,923 | 2/1946 | Little . |
| 2,507,897 | 5/1950 | Gavagnin . |
| 2,516,707 | 7/1950 | Lewyt et al. . |
| 2,921,646 | 1/1960 | Poole . |
| 3,177,635 | 4/1965 | Cawl et al. . |
| 3,320,727 | 5/1967 | Farley . |
| 3,797,064 | 3/1974 | MacFarland . |
| 3,820,310 | 6/1974 | Fromknecht et al. . |
| 3,910,781 | 10/1975 | Bryant, Jr. . |
| 4,072,483 | 2/1978 | Doyle, Jr. . |
| 4,108,778 | 8/1978 | Lambert et al. . |
| 4,118,208 | 10/1978 | Klinedinst . |
| 4,172,710 | 10/1979 | van der Molen . |
| 4,198,726 | 4/1980 | Powell, Jr. . |
| 4,268,288 | 5/1981 | Coombs . |
| 4,276,070 | 6/1981 | Hug . |
| 4,284,422 | 8/1981 | Ferland . |
| 4,355,434 | 10/1982 | Gongwer . |
| 4,373,228 | 2/1983 | Dyson ....................................... 15/353 |
| 4,443,235 | 4/1984 | Brenholt et al. . |
| 4,457,043 | 7/1984 | Oeberg et al. . |
| 4,486,206 | 12/1984 | Miyakawa et al. . |
| 4,571,772 | 2/1986 | Dyson . |
| 4,573,236 | 3/1986 | Dyson . |
| 4,593,429 | 6/1986 | Dyson . |
| 4,643,748 | 2/1987 | Dyson . |
| 4,718,924 | 1/1988 | DeMarco . |
| 4,769,052 | 9/1988 | Kowalski ................................. 55/379 |
| 4,826,515 | 5/1989 | Dyson . |
| 4,853,008 | 8/1989 | Dyson . |
| 4,853,011 | 8/1989 | Dyson . |
| 4,944,780 | 7/1990 | Usmani . |
| 5,062,870 | 11/1991 | Dyson . |
| 5,078,761 | 1/1992 | Dyson . |

(List continued on next page.)

FOREIGN PATENT DOCUMENTS

| | | |
|---|---|---|
| 1049292 | 11/1966 | United Kingdom . |
| 2265096A | 9/1993 | United Kingdom . |
| 2 280 388A | 2/1995 | United Kingdom . |
| WO 84 02282 | 6/1984 | WIPO . |

*Primary Examiner*—Robert J. Warden, Sr.
*Assistant Examiner*—Andrew Aldag
*Attorney, Agent, or Firm*—Fay, Sharpe, Fagan, Minnich & McKee, LLP

[57] ABSTRACT

An upright vacuum cleaner (A) includes an upright housing section (B) and a nozzle section (C). A cyclonic airflow dirt and dust separating chamber (54) is defined in said upright housing section. A suction source (E) pulls air and entrained dirt, dust, and other contaminants through a main suction opening (26) formed in the underside (24) of the nozzle and into the cyclonic airflow chamber (54). The cyclonic airflow chamber causes the suction airstream to travel in a cyclonic path such that the entrained contaminants are separated therefrom and deposited into a dirt container (52) that defines the lower portion of the chamber (54). A main filter assembly (50) includes a main filter element (H) for filtering residual contaminants from the suction airstream between the chamber and the suction source. The main filter element is preferably made from high-density polyethylene porous filter media. A final filter assembly (F) filters the suction airstream discharged by the suction source to ensure that the air discharged into the atmosphere is contaminant free, including those contaminants introduced into the airstream by the suction source itself.

20 Claims, 15 Drawing Sheets

U.S. PATENT DOCUMENTS

| | | | |
|---|---|---|---|
| 5,090,975 | 2/1992 | Requejo et al. | 55/528 |
| 5,090,976 | 2/1992 | Dyson . | |
| 5,101,532 | 4/1992 | Dyson . | |
| 5,145,499 | 9/1992 | Dyson . | |
| 5,160,356 | 11/1992 | Dyson . | |
| 5,230,722 | 7/1993 | Yonkers . | |
| 5,248,323 | 9/1993 | Stevenson . | |
| 5,267,371 | 12/1993 | Soler et al. . | |
| 5,271,751 | 12/1993 | Lugler et al. . | |
| 5,287,591 | 2/1994 | Rench et al. | 15/347 |
| 5,307,538 | 5/1994 | Rench et al. . | |
| 5,427,597 | 6/1995 | Osendorf | 55/528 |
| 5,464,460 | 11/1995 | Bosses | 55/DIG. 2 |
| 5,593,479 | 1/1997 | Frey et al. . | |
| 5,603,741 | 2/1997 | Frey | 55/368 |
| 5,685,894 | 11/1997 | Bowerman et al. | 55/DIG. 3 |
| 5,704,956 | 1/1998 | Loveless et al. . | |
| 5,779,745 | 7/1998 | Kilstrom | 55/DIG. 3 |

6,003,196

UPRIGHT VACUUM CLEANER WITH CYCLONIC AIRFLOW

BACKGROUND OF THE INVENTION

The present invention relates to vacuum cleaners. More particularly, the present invention relates to upright vacuum cleaners used for suctioning dirt and debris from carpets and floors.

Upright vacuum cleaners are ubiquitous. They are known to include an upper portion having a handle, by which an operator of the vacuum cleaner may grasp and maneuver the cleaner, and a lower cleaning nozzle portion which travels across a floor, carpet, or other surface being cleaned. The upper portion is often formed as a rigid plastic housing which encloses a dirt and dust collecting filter bag, although the upper portion may simply be an elongated handle with the filter bag, and an external cloth bag, being hung therefrom. The cleaning nozzle is hingedly connected to the upper handle portion such that the upper portion is pivotable between a generally vertical upright storage position and an inclined operative position. The underside of the nozzle includes a suction opening formed therein which is in fluid communication with the filter bag.

A vacuum or suction source such as a motor and fan assembly is enclosed either within the nozzle portion or the upper portion of the cleaner. The vacuum source generates the suction required to pull dirt from the carpet or floor being vacuumed through the suction opening and into the filter bag. A rotating brush assembly is typically provided in proximity with the suction opening to loosen dirt and debris from the surface being vacuumed.

To avoid the need for vacuum filter bags, and the associated expense and inconvenience of replacing the bag, another type of upright vacuum cleaner utilizes cyclonic airflow, rather than a filter bag, to separate a majority of the dirt and other particulates from the suction airstream. The air is then filtered to remove residual particulates, returned to the motor, and exhausted.

Such prior cyclonic airflow upright vacuum cleaners have not been found to be entirely effective and convenient to use. For example, with these prior cyclonic airflow vacuum cleaners, the process of emptying dust and dirt from the cyclonic chamber dirt collection container has been found to be inconvenient, and often resulted in the spillage of the cup contents. Likewise, with these prior units, replacement of the filter element has not been convenient. Other cyclonic airflow vacuum cleaners have been found to exhaust air which is not free of residual contaminants. For example, one prior unit filters the airstream after it passes through the cyclonic chamber, but thereafter passes the airstream through the motor assembly where it is potentially recontaminated by the motor assembly, itself, prior to its being exhausted into the atmosphere.

Because the cyclonic action of such vacuum cleaners does not completely remove all dust, dirt, and other contaminants from the suction airstream, it is necessary to include a filter downstream from the cyclonic chamber. As such, prior cyclonic airflow vacuum cleaners have heretofore included conventional filter elements including conventional media to filter the airstream after it passes through the cyclonic chamber. These prior filter elements have caused considerable difficulties. A conventional filter that is sufficiently fine to filter the airstream effectively unduly restricts airflow and decreases the effectiveness of the cyclonic action. On the other hand, a coarse filter does not effectively filter the airstream of residual contaminants. Further, conventional filter media, such as paper or fibrous media, has been found to clog readily, thereby unduly decreasing airflow rates over time. Thus, a need has been found for a cyclonic airflow vacuum cleaner with an effective filter positioned downstream relative to the cyclonic chamber for effectively filtering the airstream without clogging.

Accordingly, it has been deemed desirable to develop a new and improved upright vacuum cleaner which would overcome the foregoing difficulties and others while providing better and more advantageous overall results.

SUMMARY OF THE INVENTION

According to the present invention, a new and improved upright vacuum cleaner is provided.

In accordance with a first aspect of the invention, an upright vacuum cleaner includes a housing defining a cyclonic airflow chamber for separating contaminants from a suction airstream. The housing includes a suction airstream inlet and a suction airstream outlet in fluid communication with the cyclonic airflow chamber. A nozzle base includes a main suction opening which is fluidically connected with said cyclonic airflow chamber inlet. An airstream suction source is provided and has an inlet fluidically connected to said cyclonic airflow chamber outlet and a suction source exhaust outlet. The suction source selectively establishes and maintains a suction airstream from the nozzle main suction opening to the suction source exhaust outlet. A main filter assembly is positioned in fluid communication between the cyclonic airflow chamber and the suction source for filtering residual contaminants from the suction airstream downstream relative to the cyclonic airflow chamber. The main filter assembly comprises a filter element including high-density polyethylene porous filter media.

In accordance with another aspect of the invention, a vacuum cleaner includes an upright housing section including a handle. A nozzle base section is hingedly interconnected with the upright housing section and includes a main suction opening formed in an underside thereof. A cyclonic airflow chamber is defined in the upright housing section and separates dust and dirt from a suction airstream. A suction source is located in the upright section or the nozzle section and has a suction airflow inlet in fluid communication with the cyclonic chamber and a suction airflow outlet. A main filter assembly is located between the cyclonic chamber and the suction source for filtering residual dust and dirt from the suction airstream after the suction airstream passes through the cyclonic airflow chamber. A final filter assembly is located on either the housing or the nozzle base and is connected in fluid communication with the suction airflow outlet of the suction source for filtering the suction airstream exhausted by the suction source prior to the suction airstream being dispersed into the atmosphere.

In accordance with a further aspect of the invention, a vacuum cleaner includes a nozzle section. A housing section is connected to the nozzle section and is in fluid communication with the nozzle section. A cyclonic airflow chamber is located in the housing section for separating dirt and dust from a suction airstream flowing into the housing section between an inlet located at a periphery of the housing section and an outlet located at an apex of the housing section. A filter chamber is located in the housing section between the cyclonic airflow chamber and the outlet of the housing section. The filter chamber includes a first filter housing and a first filter element mounted in the first filter housing. The first filter element and the first filter housing cooperate to define a tortuous flow path for air flowing from the cyclonic airflow chamber to the outlet of the housing section.

One advantage of the present invention is the provision of a new and improved vacuum cleaner.

Another advantage of the invention is found in the provision of a vacuum cleaner with a cyclonic airflow chamber through which the suction airstream flows for separating dust and dirt from the airstream and for depositing the separated dust and dirt into an easily and conveniently emptied dirt cup.

Still another advantage of the present invention resides in the provision of a cyclonic airflow upright vacuum cleaner with a main filter that effectively filters residual contaminants from the suction airstream between the cyclonic airflow chamber and the motor assembly without unduly restricting airflow and without premature clogging.

Yet another advantage of the invention is the provision of a cyclonic airflow upright vacuum cleaner with a final filter located downstream from the suction motor assembly for filtering the suction airstream immediately prior to its exhaustion into the atmosphere.

A further advantage of the invention is the provision of a vacuum cleaner with both a main filter and a final filter wherein both the main and final filter are easily removable and replaceable.

A still further advantage of the present invention is the provision of a vacuum cleaner with a filter element mounted in a filter housing wherein the filter element and filter housing cooperate to provide a tortuous flow path for air flowing therethrough.

Still other benefits and advantages of the invention will become apparent to those skilled in the art upon reading and understanding the following detailed description.

BRIEF DESCRIPTION OF THE DRAWINGS

The invention may take form in certain components and structures, preferred embodiments of which will be illustrated in the accompanying drawings wherein.

DETAILED DESCRIPTION OF THE PREFERRED EMBODIMENTS

Referring now to the FIGURES, wherein the showings are for purposes of illustrating preferred embodiments of the invention only and not for purposes of limiting the same, FIGS. 1–6 illustrate an upright vacuum cleaner A including an upright housing section B and a nozzle base section C. The sections B,C are pivotally or hingedly connected through the use of trunnions or another suitable hinge assembly D so that the upright housing section B pivots between a generally vertical storage position (as shown) and an inclined operative position. Both the upright and nozzle sections B,C are preferably made from conventional materials such as molded plastics and the like. The upright section B includes a handle 20 extending upward therefrom by which an operator of the vacuum A is able to grasp and maneuver the vacuum.

Figure 1:
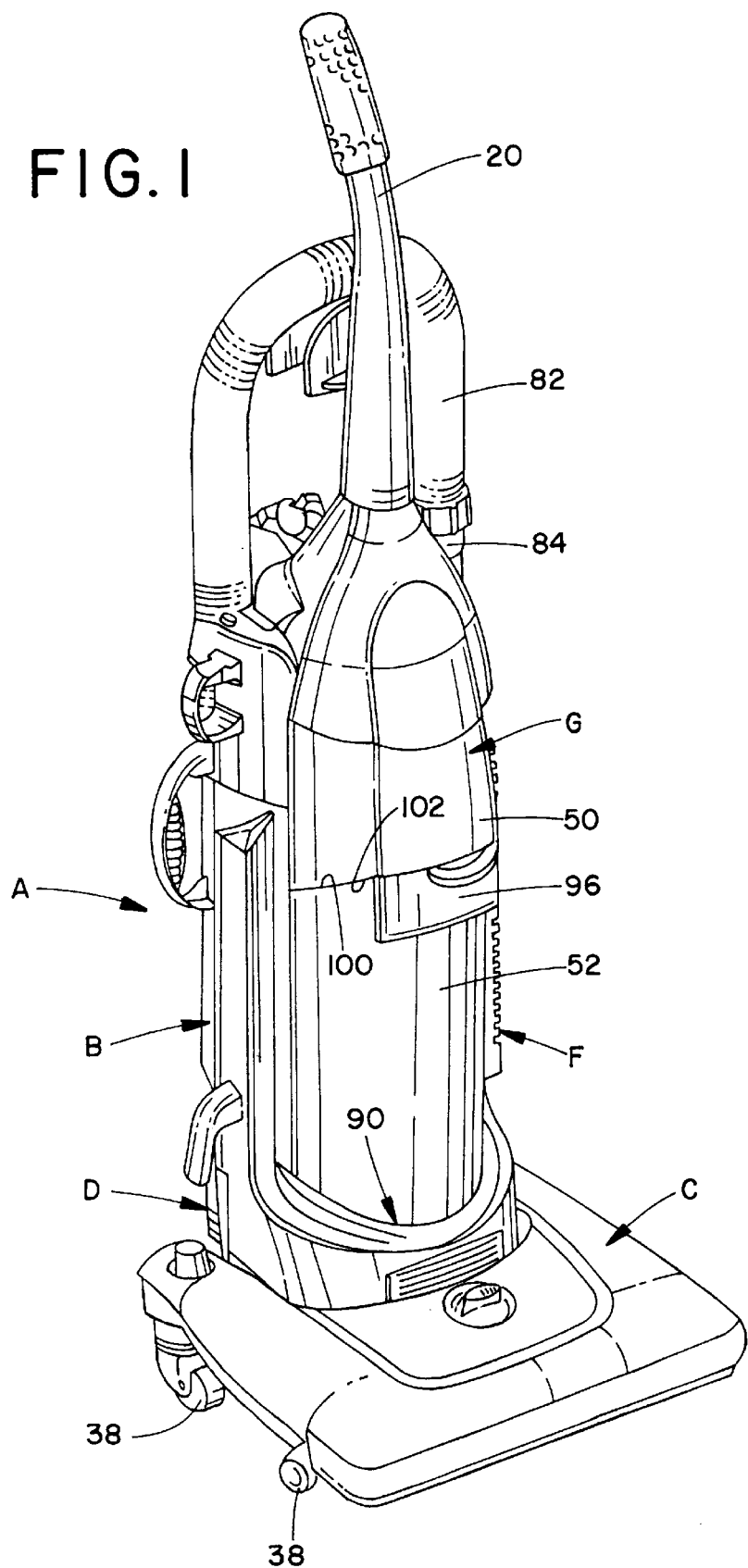
FIG. 1 is a perspective view illustrating a cyclonic airflow upright vacuum cleaner in accordance with the present invention.
Figure 2:
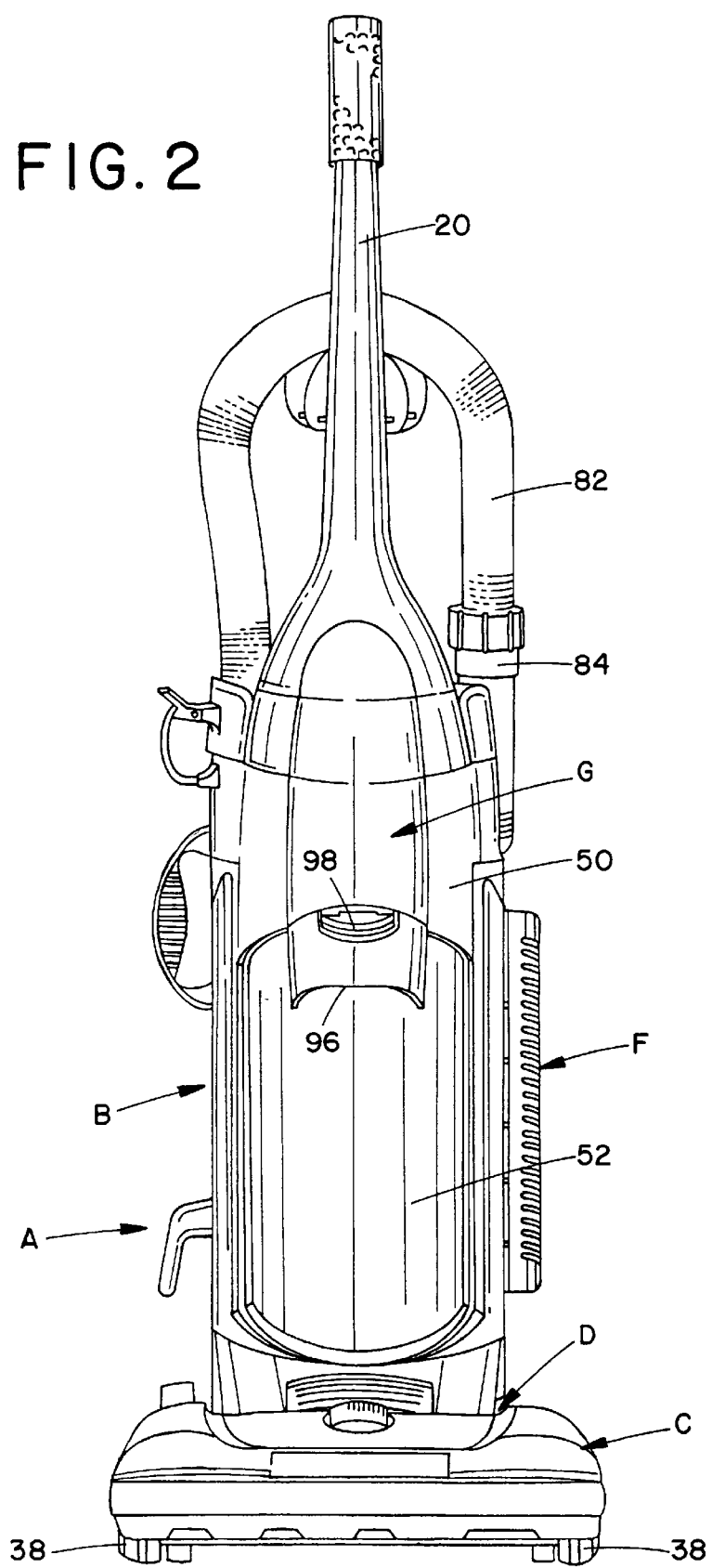
FIG. 2 is a front elevational view of the vacuum cleaner illustrated in FIG. 1.
Figure 3:
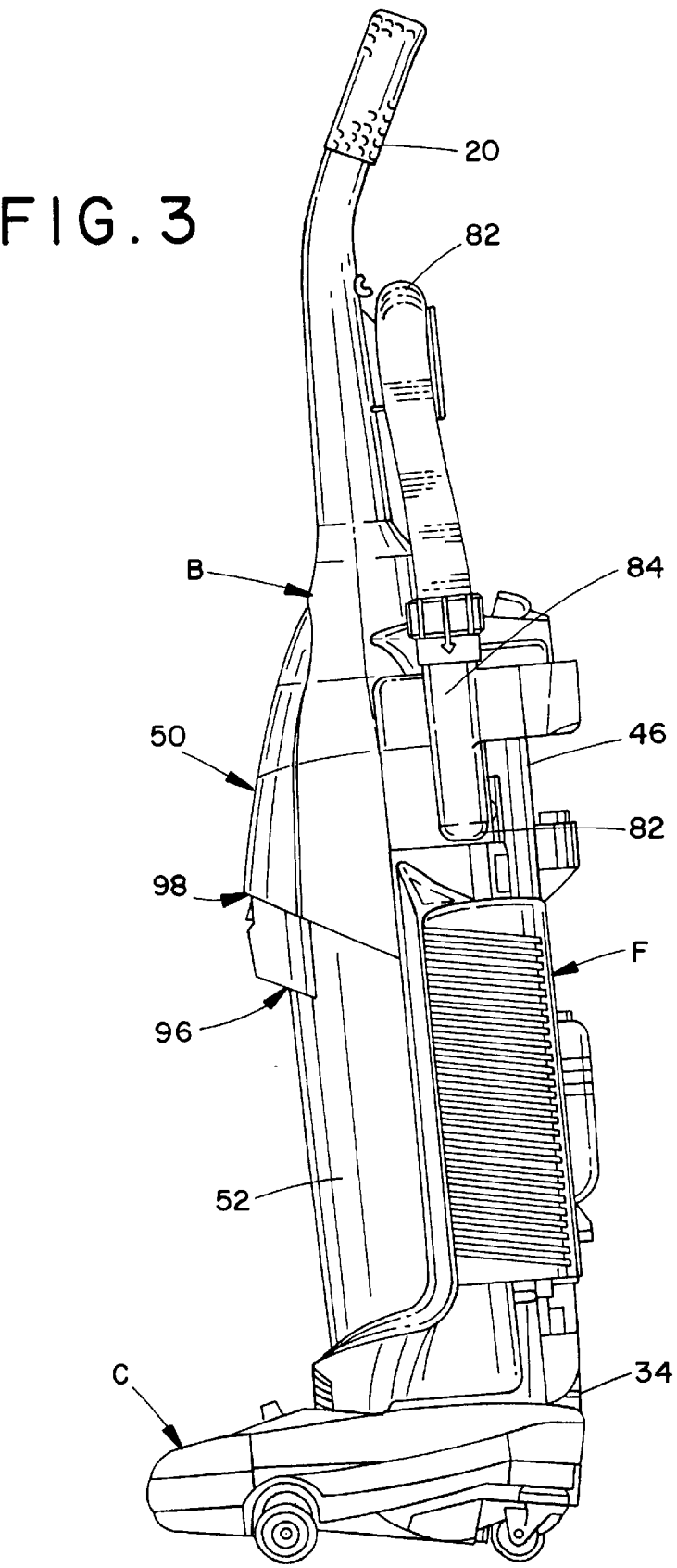
FIGS. 3 and 4 are left and right side elevational views, respectively, of the vacuum cleaner shown in FIG. 1.
Figure 4:
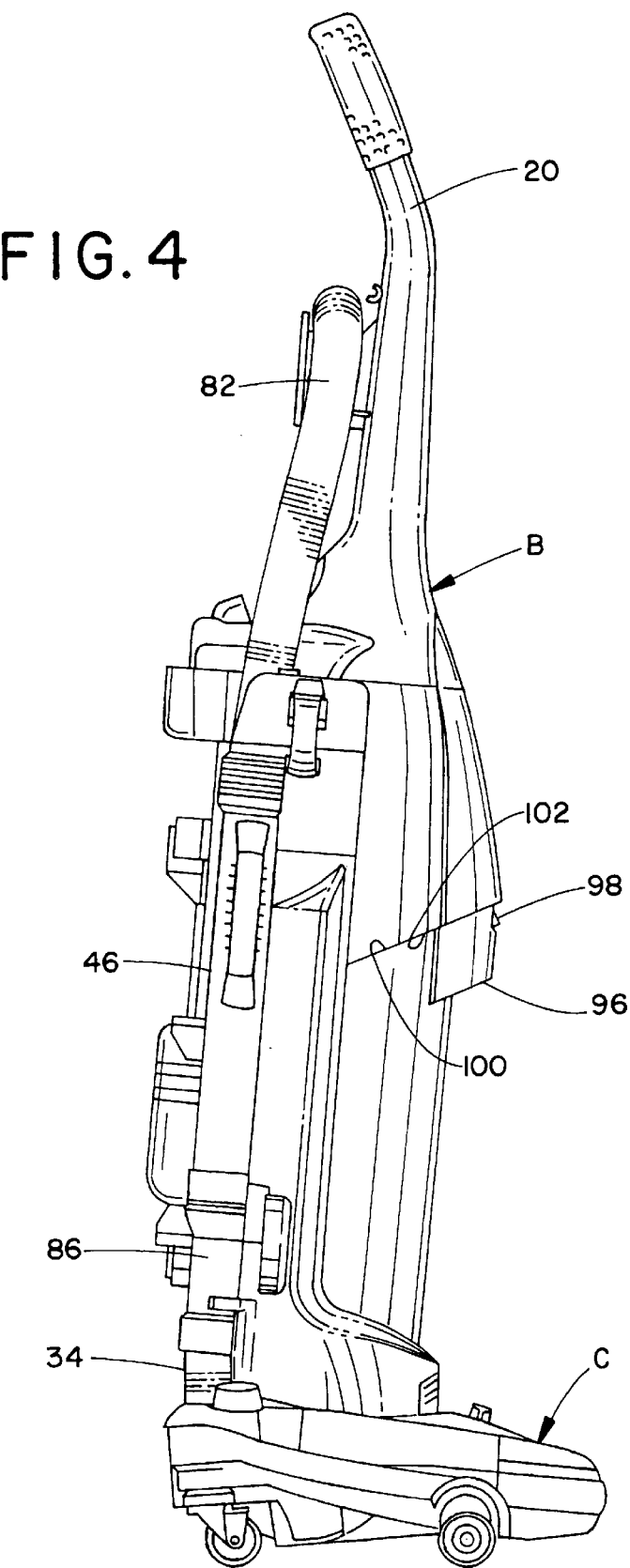
Figure 5:
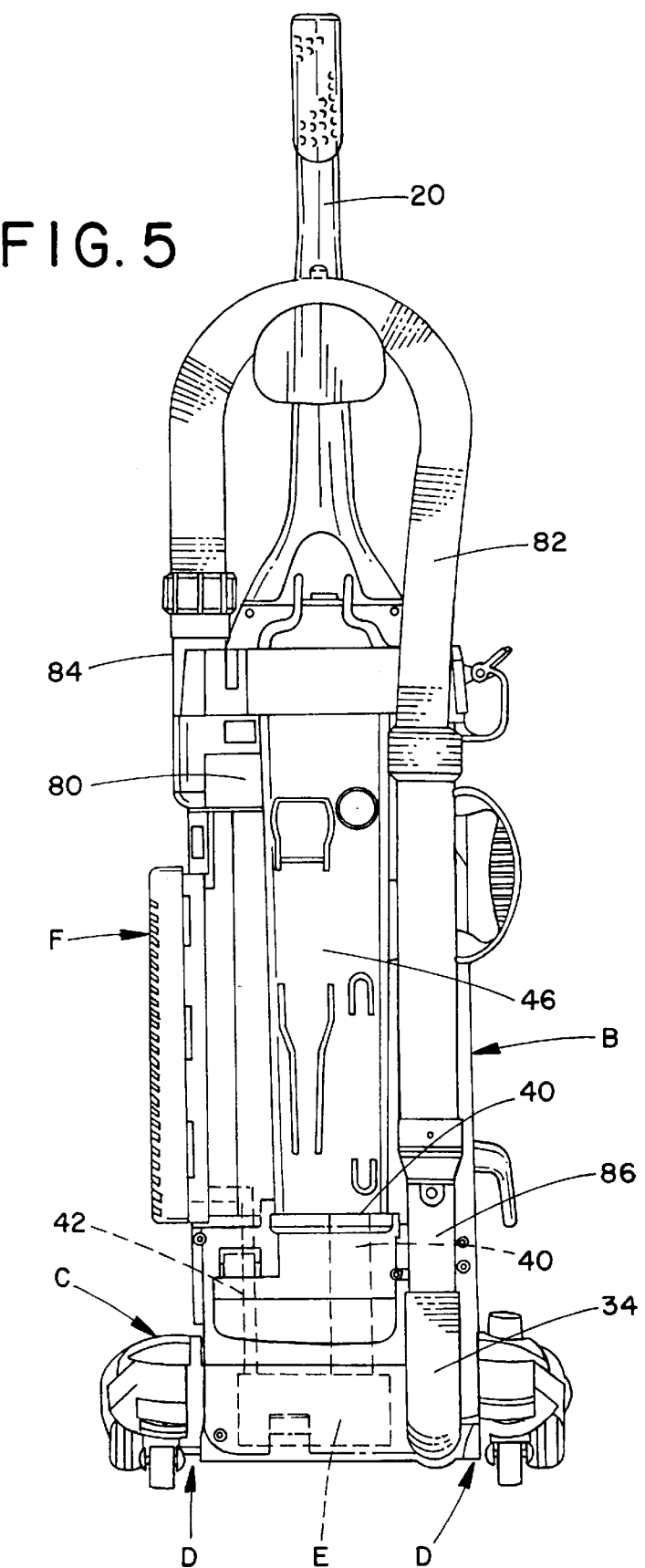
FIG. 5 is a rear elevational view of the vacuum cleaner of FIG. 1, further showing the required suction hose assemblies in broken lines for clarity.
Figure 6:
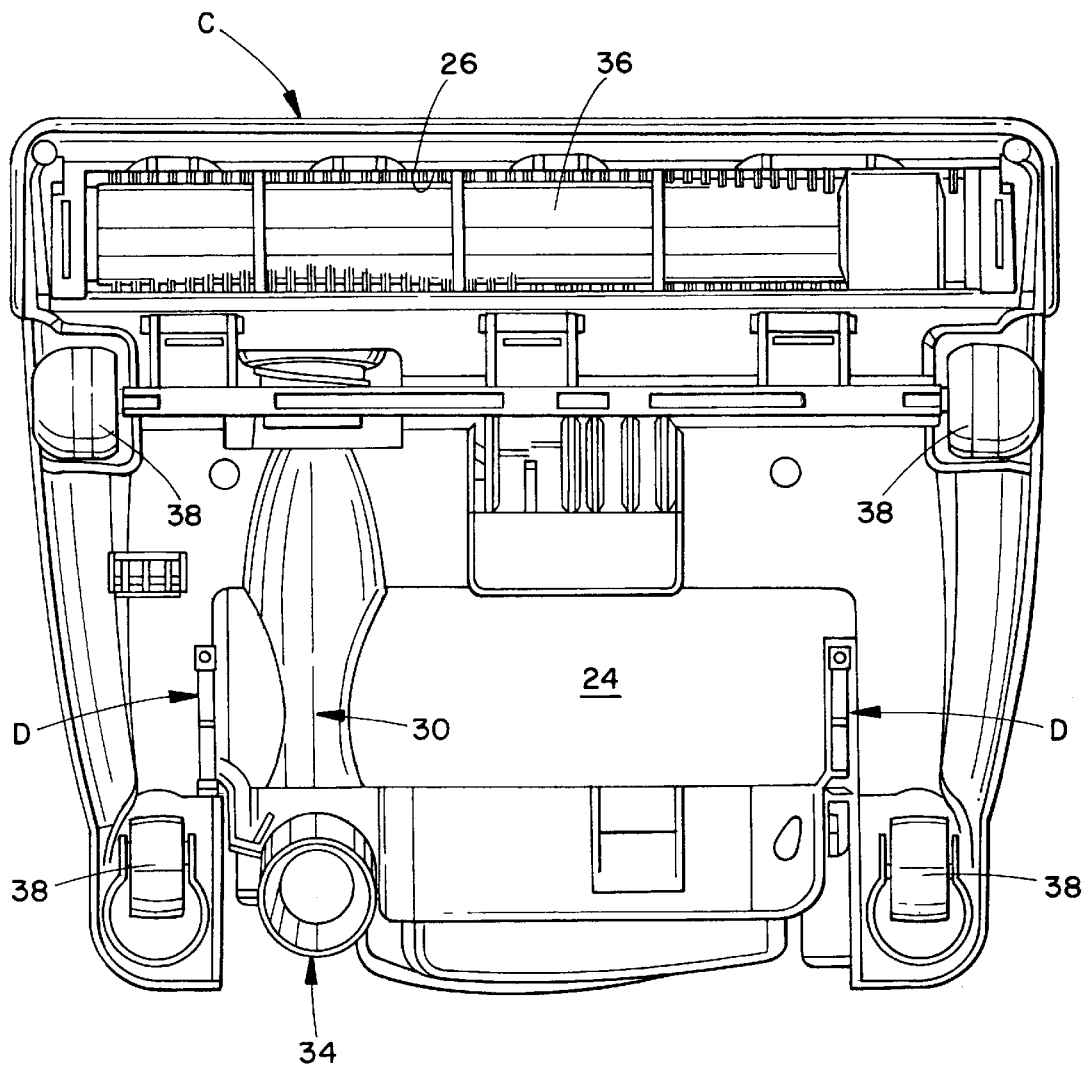
FIG. 6 is a bottom plan view of the vacuum cleaner of FIG. 1.

During vacuuming operations, the nozzle base C travels across the floor, carpet, or other subjacent surface being cleaned. The underside 24 (FIG. 6) of the nozzle includes a main suction opening 26 formed therein which extends substantially across the width of the nozzle at the front end thereof. The main suction opening 26 is in fluid communication with the vacuum upright body section B through a passage 30 and a connector hose assembly 34 (FIG. 5). A rotating brush assembly 36 is positioned in the region of the nozzle main suction opening 26 for contacting and scrubbing the surface being vacuumed to loosen embedded dirt and dust. A plurality of wheels 38 support the nozzle on the surface being cleaned and facilitate its movement thereacross.

Figure 9:
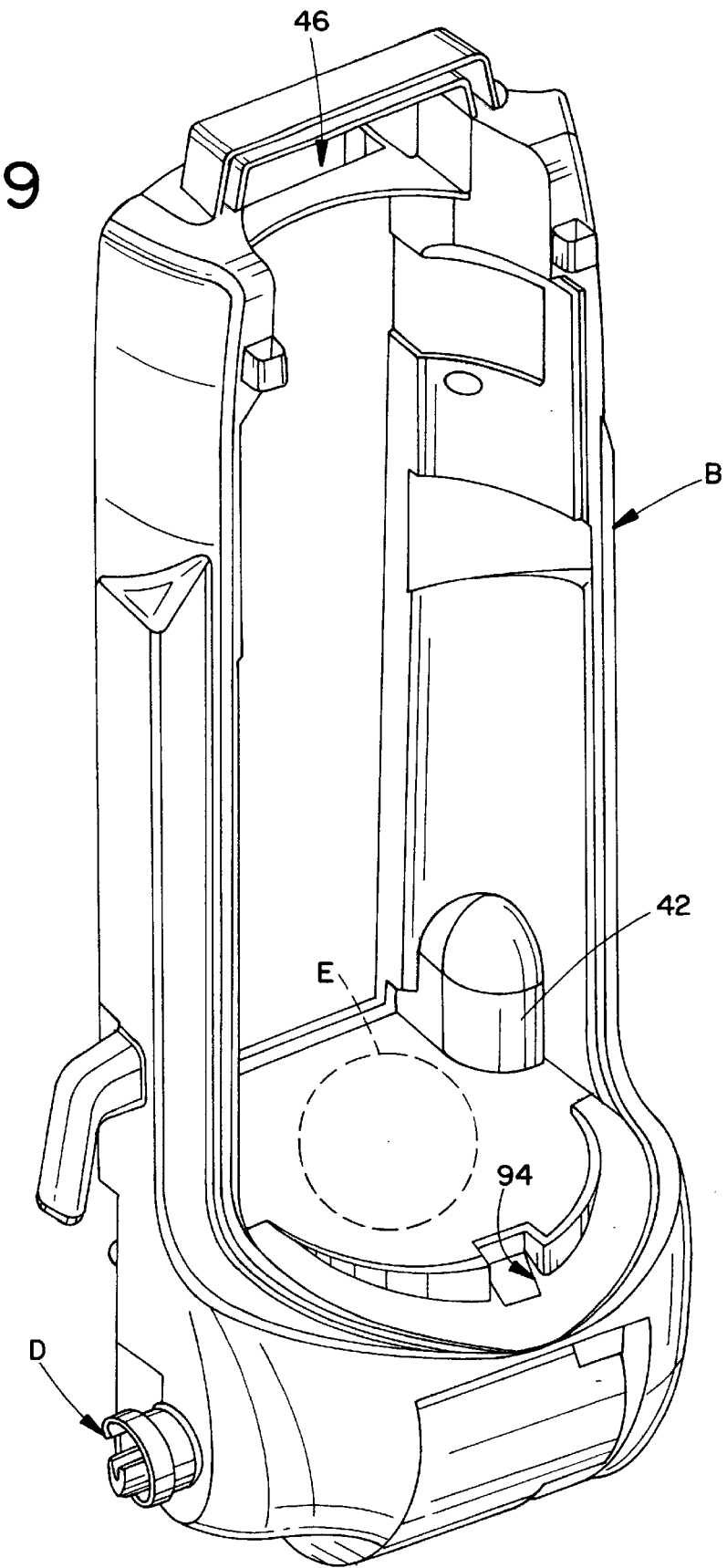
FIG. 9 is a perspective view of the upright body portion shown in FIG. 7, with the dirt cup and main filter housing removed for clarity.

The upright vacuum cleaner A includes a vacuum or suction source for generating the required suction airflow for cleaning operations. With reference particularly to FIGS. 5 and 9, a suitable suction source, such as an electric motor and fan assembly E, generates a suction force in a suction inlet 40 an exhaust force in an exhaust outlet 42. The motor assembly airflow exhaust outlet 42 is in fluid communication with a final filter assembly F for filtering the exhaust airstream of any contaminants immediately prior to its discharge into the atmosphere. The motor assembly suction inlet 40, on the other hand, is in fluid communication with an elongated suction conduit 46 which extends upward from the motor/fan assembly E to an upper region of the upright section B where it communicates with the cyclonic suction airflow dust and dirt separating region G of the vacuum A to generate a suction force therein.

Figure 7:
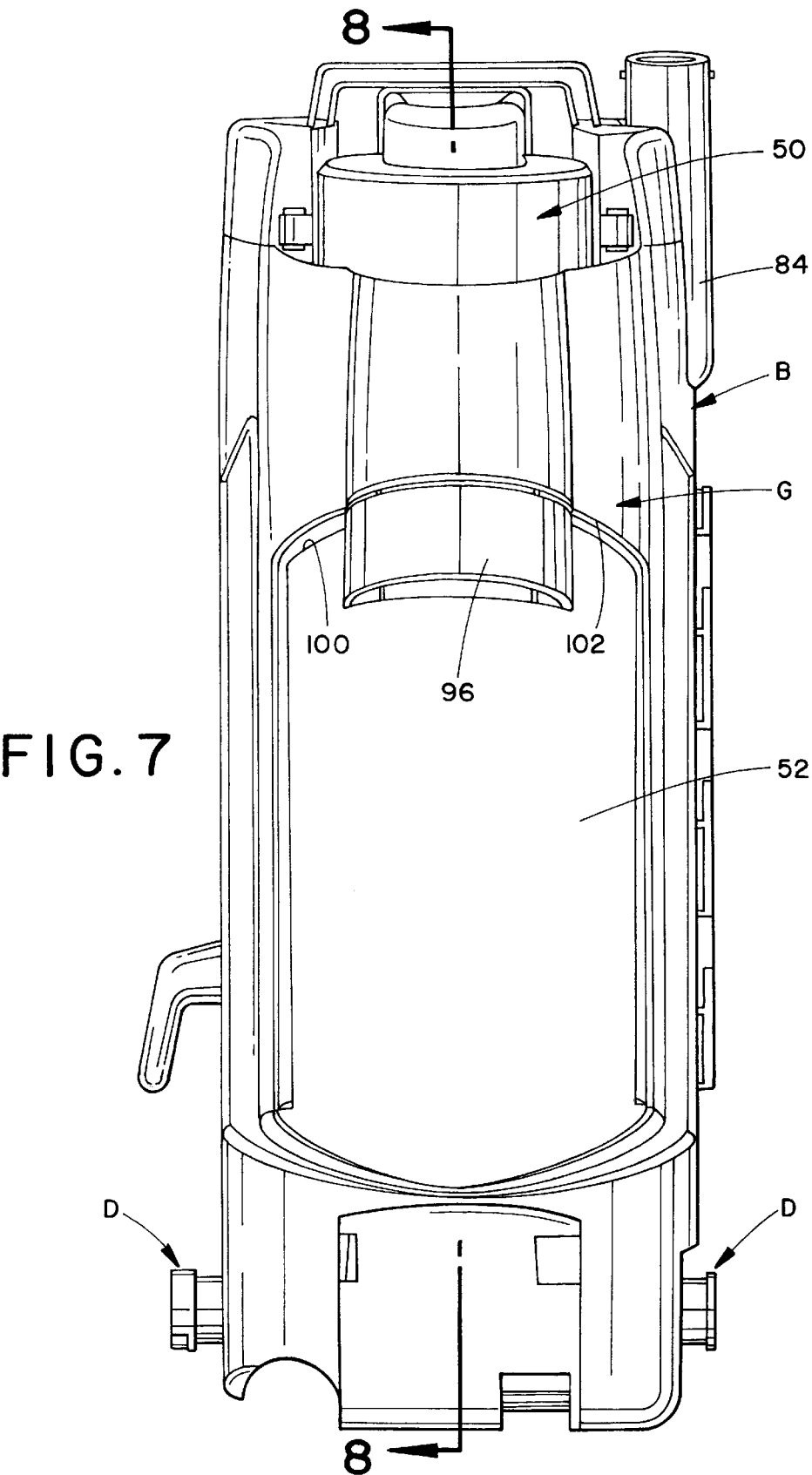
FIG. 7 is a front elevational view of the upright body portion of the vacuum cleaner of FIG. 1.
Figure 8:
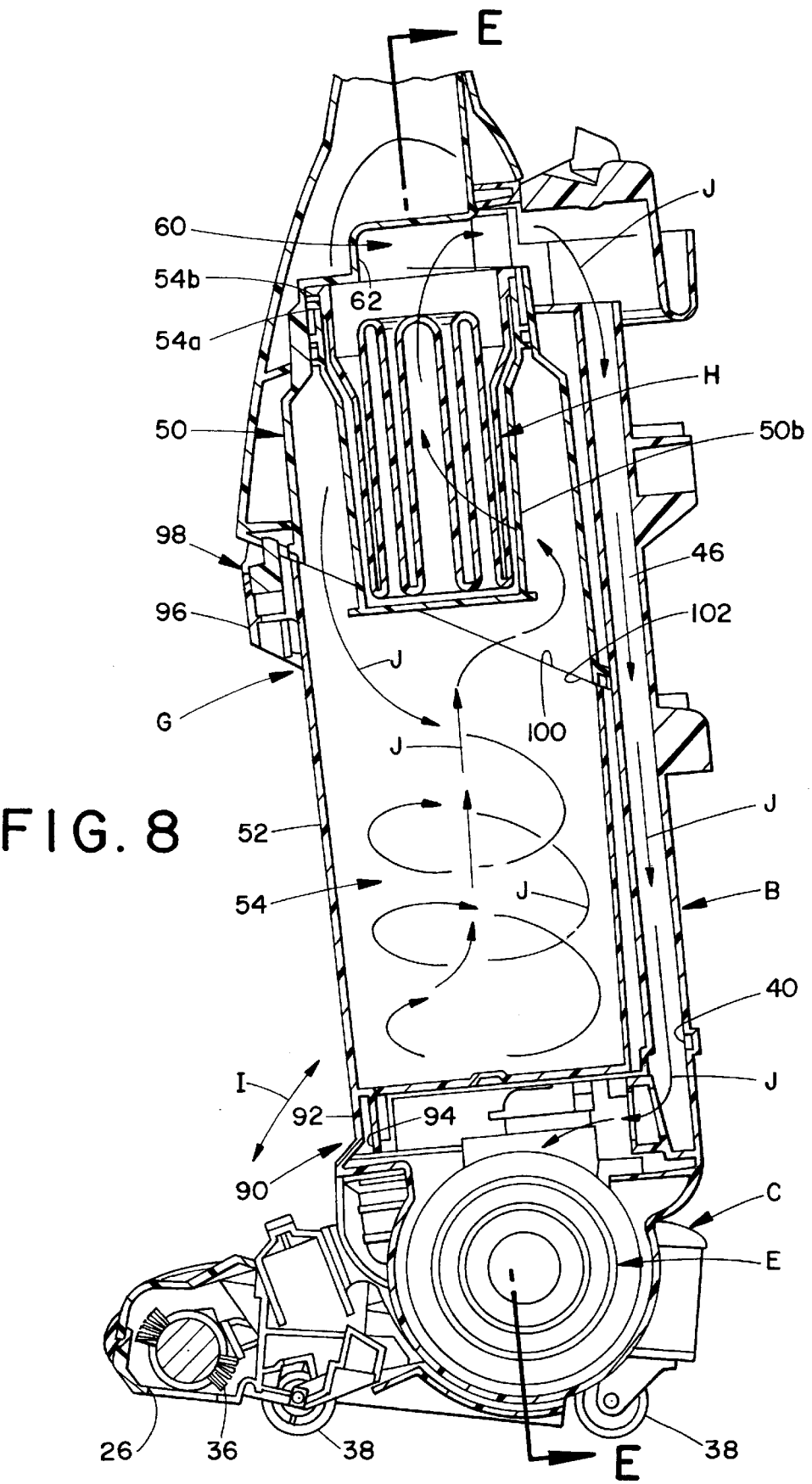
FIG. 8 is a partial side view in cross-section of the vacuum cleaner illustrated in FIG. 1, and further diagrammatically illustrating the suction airstream flow.

With reference particularly to FIGS. 7 and 8, the cyclonic suction airflow dust and dirt separating region G housed in the upright section B includes a main filter housing assembly 50 and a mating dust and dirt cup or container 52. The sections 50,52 together define a generally cylindrical cyclonic airflow chamber 54.

Figure 10:
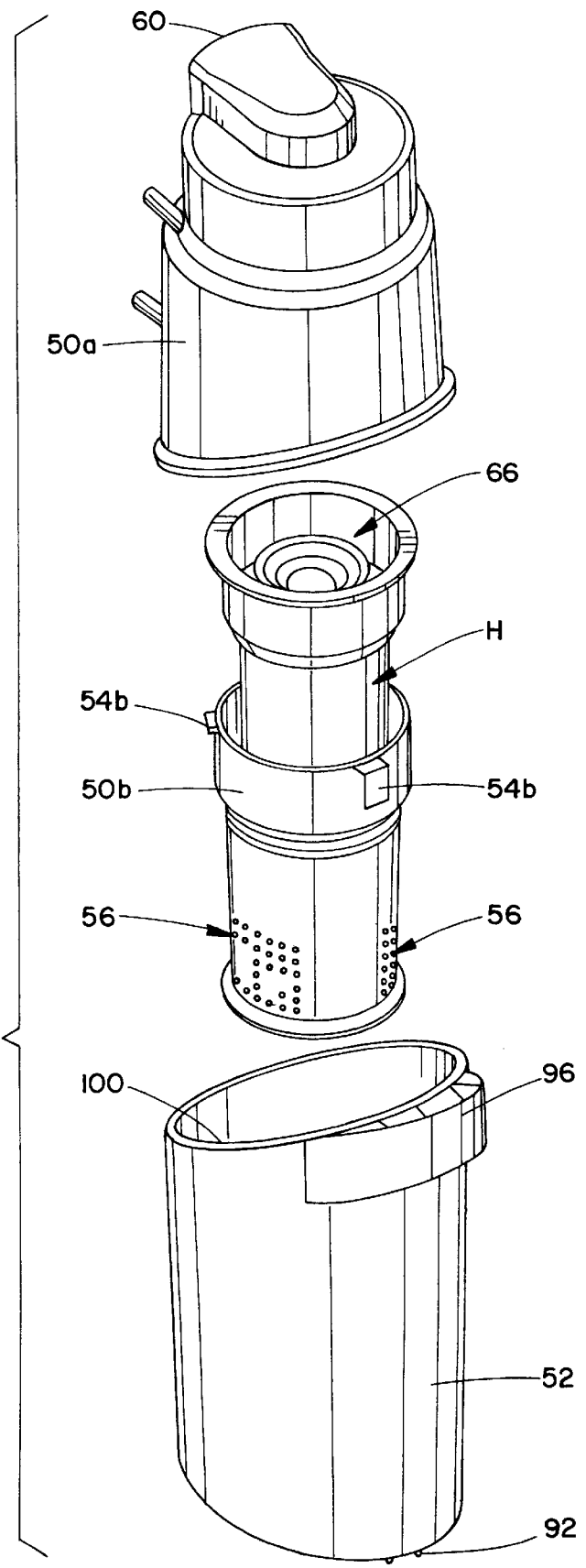
FIG. 10 is an exploded perspective view of the main filter, main filter housing, and dirt cup.

It may be seen with reference also to FIG. 10 that the main filter housing assembly 50 is, itself, constructed from two mating sections—an upper fixed housing section 50a, and a lower, detachable filter housing section 50b. The lower detachable filter housing section 50b receives and retains a main filter element or cartridge H. The filter housing section 50b releasably connects with the upper housing section 50a to secure the filter element H in an operative filtering position. More particularly, the section 50b includes a plurality of tabs or tangs 54b extending therefrom. Likewise, with reference also to FIG. 12B, it is shown that the upper housing section 50a includes mating tabs or tangs 54a. Thus, those skilled in the art will recognize that the components 50a,50b connect in a key-like fashion upon rotation of the filter housing section 50b in relation to the upper housing section 50a so that a filter element H is operatively secured in position. Of course, rather than the mating tabs 54a,54b, the two housing sections 50a,50b may alternatively include mating threads, clips, or other suitable cooperating fastening means. The filter housing section 50b includes a plurality of apertures, slots, or other passages 56 formed therethrough, preferably in the lower half thereof, so that the suction airstream flows freely from the chamber 54 into the filter housing section 50b and to the main filter element H.

The housing upper section 50a includes a suction airflow outlet passage 60 (FIG. 8) which communicates with the cyclonic chamber 54 through an aperture 62. The outlet passage 60 also communicates with the elongated suction conduit 46 leading to the motor/fan assembly E when the main filter housing assembly 50 is operatively connected to the vacuum upright section B. FIGS. 8 and 9 show that the elongated suction conduit 46 extends from the motor/fan assembly E upward to communicate with the main filter housing suction outlet passage 60 so that the suction inlet of the motor/fan assembly E is able to fluidically communicate with the cyclonic chamber 54. When the main filter housing assembly 50 is assembled and in the operative position as described, a mouth 66 (FIG. 10) of the filter element H mates with the periphery of the aperture 62 in a fluid-tight relationship. As such, the suction airflow from the cyclonic chamber 54 to the motor/fan assembly suction inlet 42 is not able to bypass the main filter element H, but instead must pass therethrough and be filtered of residual contaminants. It is preferable that the aperture 62, and thus the main filter element H be centrally located in the cyclonic chamber 54 to facilitate the cyclonic airflow in the chamber.

Figure 12A:
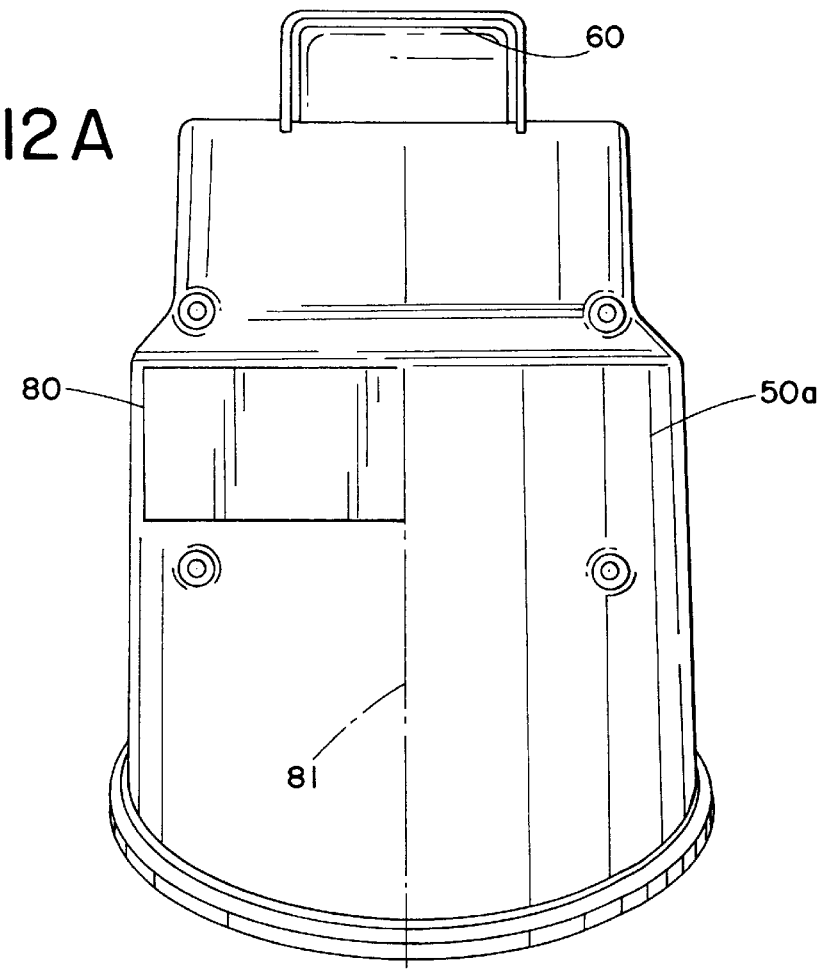
FIGS. 12A and 12B are rear elevational and bottom plan views, respectively, of the upper portion of the main filter housing.
Figure 12B:
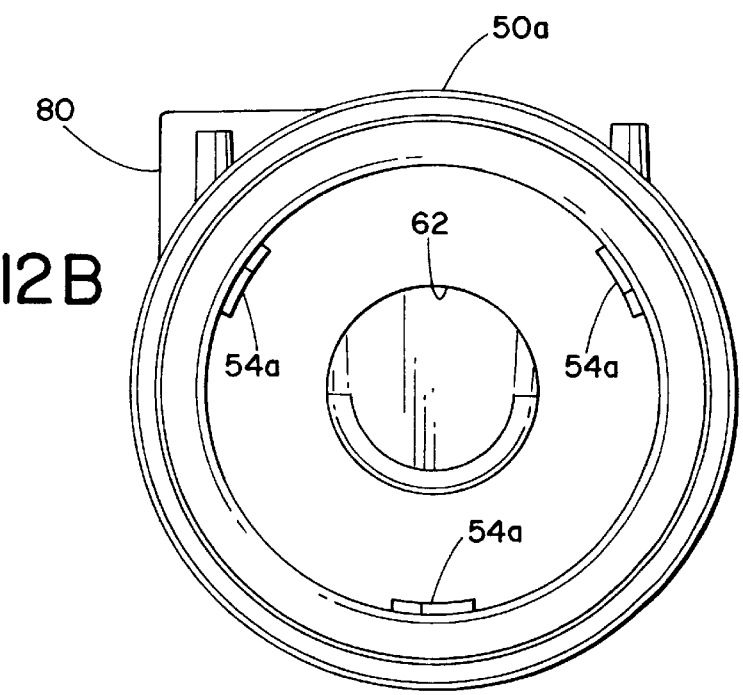

The suction airstream enters an upper portion of the cyclonic dust and dirt separation chamber 54 through a generally tangential suction airstream inlet 80. In the preferred embodiment, as shown in FIGS. 12A–12B, the cyclonic chamber airstream inlet 80 is formed in the upper section 50a of the main filter housing assembly 50. It is noted that the inlet 80 is disposed entirely on one side of a center line 81 of the upper housing section so as to induce a swirling flow around the filter housing section 50b. The suction airstream inlet 80 of the chamber 54 is in fluid communication with a suction airstream hose 82 through a fitting 84. As shown in FIG. 5, the hoses 82,34 are fluidically connected via fitting 86. As such, the main suction opening 26 formed in the nozzle underside 24 is in fluid communication with the cyclonic chamber 54 through the passage 30, the hoses 34,82, and the cyclonic chamber suction inlet 80.

The dirt container 52 of the cyclonic airflow dust and dirt separating assembly G is constructed for large capacity and ease of emptying the contents as necessary. In FIG. 8, it may be seen that the dirt container 52 defines over ¼ the volume of the cyclonic chamber 54. As such, the capacity of the container 52 is maximized to lengthen the operational time before the dirt container 52 must be emptied.

The dirt container 52 is connected to the vacuum upright section B through use of a hinge assembly 90 which allows the dirt container 52 to pivot as indicated by the arrow I between an operative upright position and an open forwardly tilted position. As shown herein, the hinge 90 comprises a first component 92 connected to the dirt container 52 and a second mating component 94 formed on the upright section B. Once the dirt container 52 is pivoted to the open position, it may be pulled upward and away from the section B and separated therefrom for ease of emptying the dirt container. Of course, after the dirt container is emptied, the foregoing procedure is reversed so that the dirt container is once again in the operative position. A handle 96 is provided on the exterior of the container 52 to facilitate operator movement of the container between the operative, open, and removed position. A resiliently biased latch 98 retains the dirt container in the operative position. The latch 98 is biased through use of a spring or other resilient member, or via the natural resiliency of the plastic from which it is molded.

With continuing reference to FIG. 8, the dirt container upper edge 100 defining an open upper end of the container 52 is preferably inclined downwardly in the direction away from the handle 96 or front of the container 52. The main filter housing assembly section 50 is formed with a complimentary mating inclined edge 102, and a seal such as a gasket or other structure (not shown) is provided between the edges 100,102 to prevent air leakage into the cyclonic airflow chamber 54. The inclined upper edge 100 of the dirt container 52 also ensures that, when the container is pivoted to the open position, the upper edge 100 lies in a substantially horizontal plane. As such, the contents of the container are much less likely to spill when the container is opened during emptying operations. Preferably, the angle at which the upper edge 100 is inclined from horizontal is selected, in combination with the maximum distance the container is able to be pivoted on the arc I when opened, such that when the container is fully opened, the upper edge lies in a substantially horizontal plane.

Figure 13A:
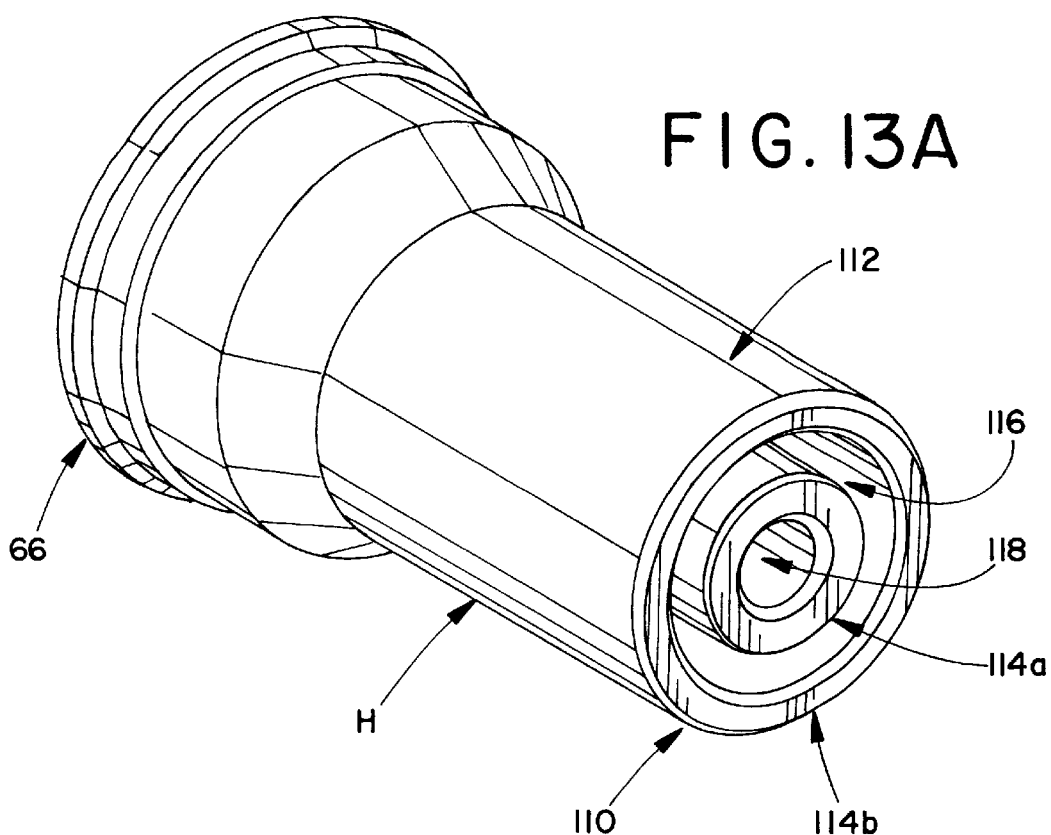
FIG. 13A is a perspective view of a main filter in accordance with the present invention.
Figure 13B:
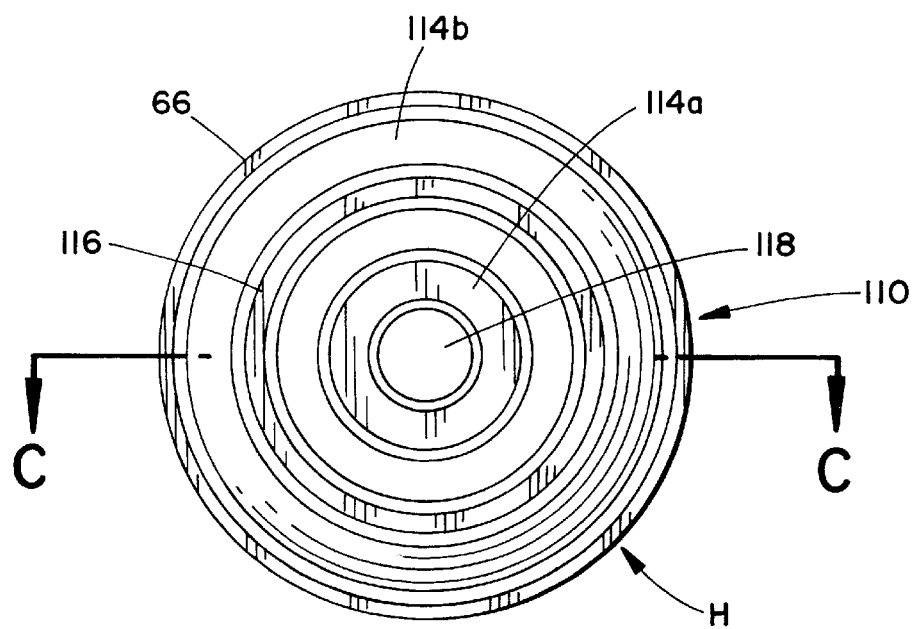
FIG. 13B is a bottom plan view of the main filter.
Figure 13C:
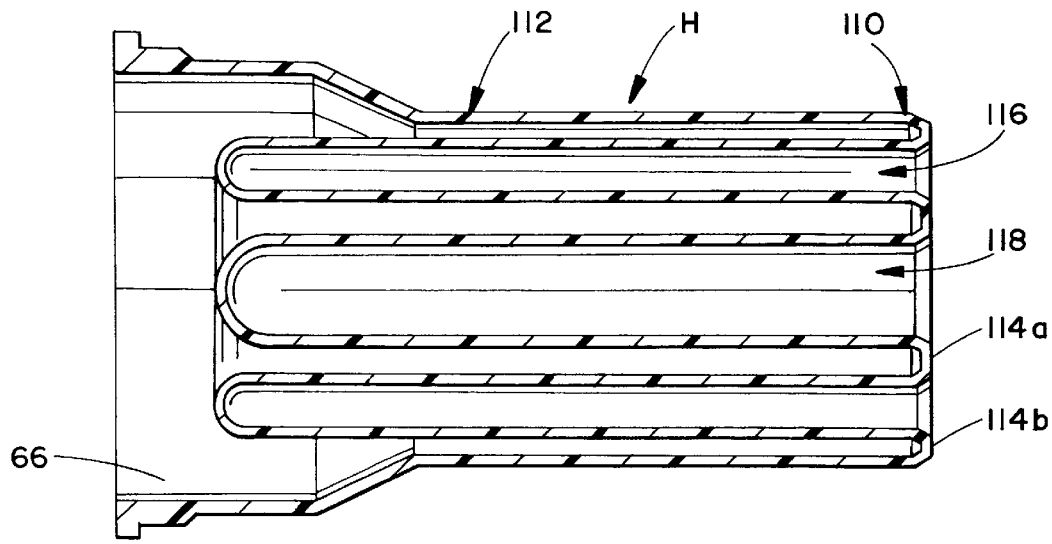
FIG. 13C is a cross-sectional view of the main filter along line C—C of FIG. 13B.

As is shown in FIGS. 13A–13C, the main filter element H is preferably generally frusto-conical in overall configuration, converging in the direction away from the filter mouth 66 toward an opposite filter end 110. However, those skilled in the art will recognize that a cylindrical or other filter configuration may be advantageously employed without departing from the scope and overall intent of the invention.

Figure 13D:
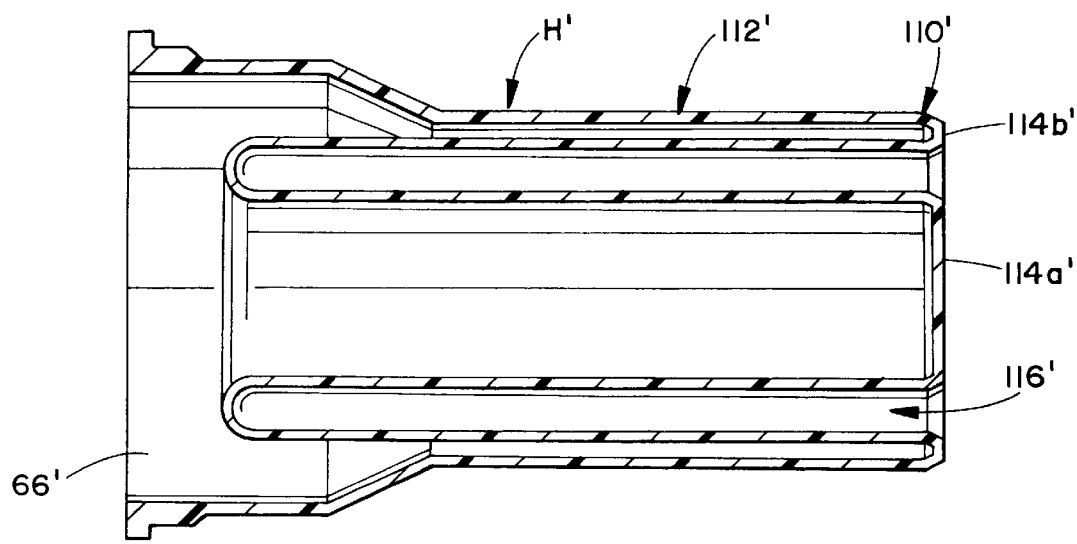
FIG. 13D is a cross-sectional view of an alternative main filter element in accordance with the present invention; and, FIG. 14 is a front elevational view, partially in cross-section along line E—E of FIG. 8, illustrating the upright body portion of the vacuum cleaner of FIG. 1.

The preferred filter media comprises Porex® brand high density polyethylene-based open-celled porous media available commercially from Porex Technologies Corp., Fairburn, Ga. 30213, or an equivalent foraminous filter media. This preferred filter media is a rigid open-celled foam that is moldable, machinable, and otherwise workable into any shape as deemed advantageous for a particular application. Most preferably, to optimize filtration but also to allow sufficient airflow rates, the preferred filter media has an average pore size in the range of 45 $\mu$m to 90 $\mu$m. As is shown in FIGS. 13A–13C, the filter H is most preferably formed in a convoluted or circuitous configuration to maximize an outer surface area 112 of the filter. The maximized surface area 112 allows for the filter media to have a smaller pore size without unduly restricting the airflow therethrough. Most preferably, the filter media is formed into at least two elongated and concentric cylinders and/or frustums 114a,114b with a deep annular passage 116 defined therebetween. Preferably, a deep central passage 118 is defined in the innermost cylinder or frustum 114a. However, it should be appreciated that other filter designs could also be used if so desired. For example, it is possible to use a filter element not having a deep central passage. FIG. 13D illustrates such an alternative configuration of the main filter element H'. Like components relative to the main filter element H are identified with like numerals including a primed (') suffix. The filter element H' is formed by concentric cylindrical portions 114a',114b' separated by a deep annular passage 116'. However, unlike the main filter element H, the element H' does not include a deep central passage formed in the inner cylinder 114a'.

Figure 11:
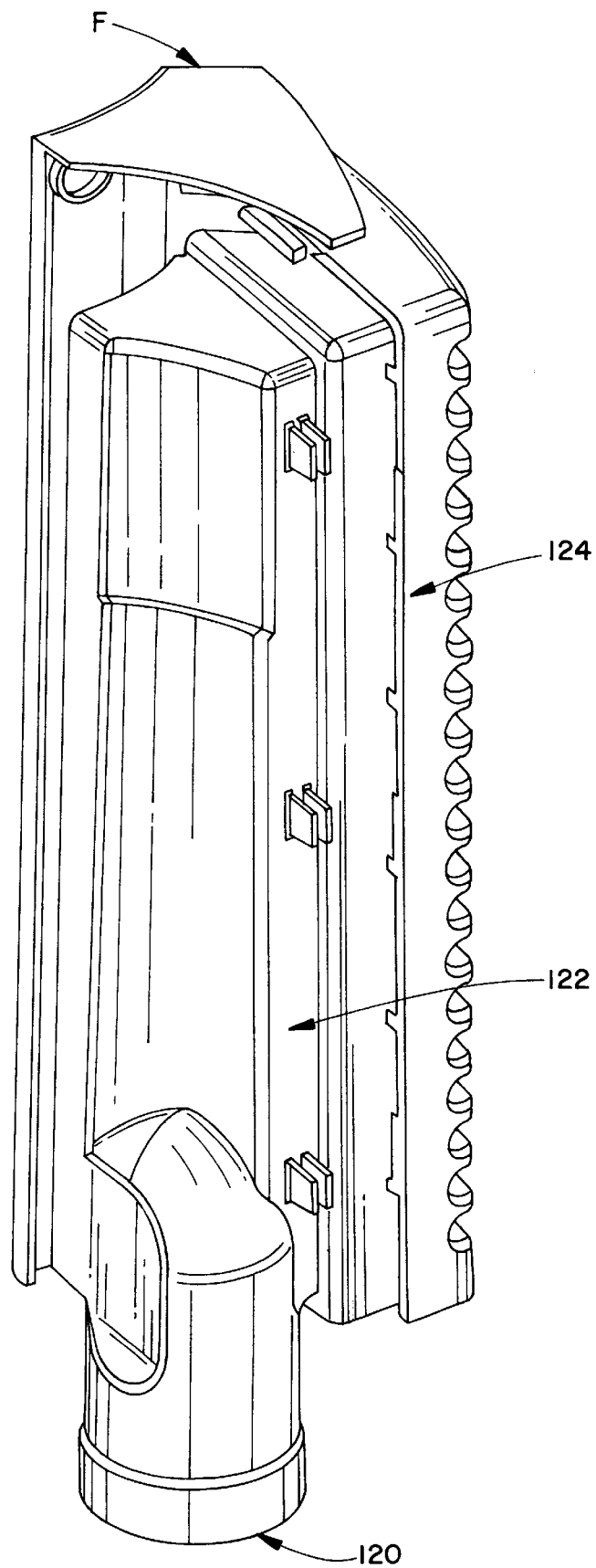
FIG. 11 is a perspective view of the final filter assembly in accordance with the present invention.

As mentioned, the subject vacuum A also comprises a final filter assembly F for filtering the suction airstream downstream from the motor/fan assembly and immediately prior to its exhaustion into the atmosphere. The preferred final filter assembly F is illustrated most clearly in FIG. 11 and comprises a suction airstream inlet 120 which is connected in fluid communication with the exhaust outlet 42 of the motor and fan assembly E. The inlet 120 is itself in fluid communication with an elongated plenum 122 that opens to the atmosphere and houses filter media. A protective grid or grate structure is snap-fit or otherwise effectively secured over the plenum 122 to secure the filter media in place. The filter media is preferably a high efficiency particulate arrest (HEPA) filter element in a sheet or block form. The filter media is retained in position in the plenum by the grid 124, but is easily replaced by removing the grid. As such, those skilled in the art will recognize that even if the motor/fan assembly causes contaminants to be introduced into the suction airstream downstream from the main filter element H, the final filter assembly F will remove the same such that only contaminant-free air is discharged into the atmosphere.

Figure 14:
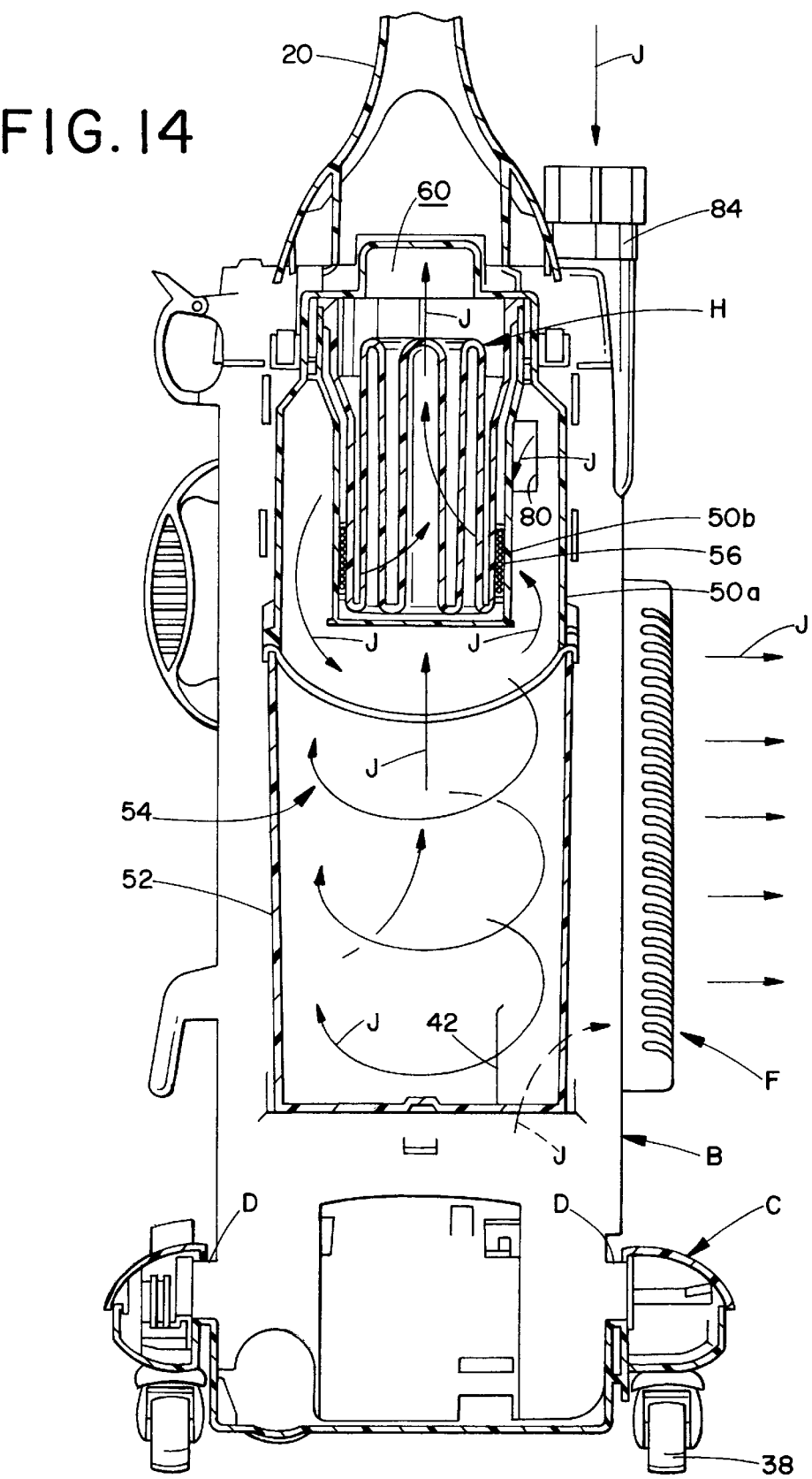

Referring primarily to FIGS. 8 and 14, the operation of the vacuum cleaning apparatus A is illustrated, with the flow of the suction airstream indicated by use of arrows J. The motor/fan assembly E or other suction generator establishes a suction force at its suction inlet 42, in the elongated suction conduit 46, and thus in the cyclonic separation chamber 54. This suction force or negative pressure in the chamber 54 is communicated to the main suction opening 26 formed in the nozzle underside 24 through the hoses 82,34 (FIG. 5) and associated fittings. This, then, in combination with the scrubbing action of the rotating brush assembly 36 causes dust and dirt from the surface being cleaned to be entrained in the suction airflow J and pulled into the upper portion of the chamber 54 through the generally tangential inlet 80.

The location of the inlet 80, the outlet passage 60, and the generally cylindrical configuration of the chamber 54 causes the suction airstream to follow a swirling or cyclonic path downward within the chamber 54 and then to move upward through a central portion of the chamber 54 toward the centrally located main filter housing section 50b. The orientation of the inlet 80 will affect the direction of cyclonic airflow, and the invention is not meant to be limited to a particular direction, i.e, clockwise or counterclockwise. Those skilled in the art will certainly recognize that the term "cyclonic" as used herein is not meant to be limited to a particular direction of airflow rotation. This cyclonic action separates a substantial portion of the entrained dust and dirt from the suction airstream and causes the dust and dirt to be deposited in the dirt cup or container 52. The suction airstream then passes through the apertures 56 formed in the main filter housing section 50b, passes through the main filter element H so that residual contaminants are removed, and exits the cyclonic chamber 54 through the suction airstream outlet passage 60 formed in the main filter housing section 50a. The suction airstream is communicated to the motor/fan assembly E and exhausted through the outlet 42 (as indicated by broken arrows) to the final filter assembly F where it is filtered again by the HEPA filter to remove any contaminants that passed through the chamber 54 and the filter H, and any contaminants in the airstream due to its passage through the motor/fan assembly E.

The main filter element H can be cleaned by washing it, either manually or in a dishwasher—since it is dishwasher-safe—to remove dust or dirt particles adhering to the filter element. It is, however, important that the filter H be dried before it is used again. The final filter media of the filter assembly F, however, can not be cleaned and must be replaced when it becomes clogged.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A vacuum cleaner comprising:
    a housing defining a cyclonic airflow chamber for separating contaminants from a suction airstream, said housing further comprising a suction airstream inlet and a suction airstream outlet in fluid communication with said cyclonic airflow chamber;
    a nozzle base including a main suction opening, said main suction opening being fluidically connected with said cyclonic airflow chamber inlet;
    an airstream suction source having an inlet fluidically connected to said cyclonic airflow chamber outlet and a suction source exhaust outlet, said suction source selectively establishing and maintaining a suction airstream from said nozzle main suction opening to said suction source exhaust outlet;
    a main filter assembly positioned centrally within said cyclonic airflow chamber for filtering residual contaminants from said suction airstream prior to exit of said suction airstream from said cyclonic airflow chamber, said main filter assembly comprising a washable, rigid filter element including high-density polyethylene open-celled foam porous filter media.

2. A vacuum cleaner comprising:
    a housing defining a cyclonic airflow chamber for separating contaminants from a suction airstream, said housing further comprising a suction airstream inlet and a suction airstream outlet in fluid communication with said cyclonic airflow chamber;
    a nozzle base including a main suction opening, said main suction opening being fluidically connected with said cyclonic airflow chamber inlet;
    an airstream suction source having an inlet fluidically connected to said cyclonic airflow chamber outlet and a suction source exhaust outlet, said suction source selectively establishing and maintaining a suction airstream from said nozzle main suction opening to said suction source exhaust outlet;
    a main filter assembly positioned in fluid communication between said cyclonic airflow chamber and said suction source for filtering residual contaminants from said suction airstream downstream relative to said cyclonic airflow chamber, said main filter assembly comprising a filter element including high-density polyethylene porous filter media with pores having an average pore size of approximately 45 $\mu$m to approximately 90 $\mu$m.

3. The vacuum cleaner as set forth in claim 2 wherein said filter element is one of cylindrical and frusto-conical in overall shape and has a convoluted outer surface defining at least two concentric sections separated by a generally annular passage.

4. The vacuum cleaner as set forth in claim 2 wherein said main filter assembly further comprises:

an upper portion including an aperture defined therethrough in fluid communication with said suction airstream outlet of said cyclonic chamber; and, a lower portion housing said filter element, said lower portion including a plurality of airflow apertures formed therethrough, said upper and lower portions of said main filter assembly including cooperating fasteners for releasably connecting said lower portion to said upper portion, wherein said filter element is positioned between said upper portion and said lower portion plurality of airflow apertures to filter said suction airstream exiting said cyclonic airflow chamber and flowing through said suction airstream outlet.

5. The vacuum cleaner as set forth in claim 4 wherein said cooperating fasteners comprise a first set of tangs extending from said upper portion of said main filter assembly, and a second set of mating tangs provided on said lower portion of said main filter assembly.

6. The vacuum cleaner as set forth in claim 2 further comprising a final filter assembly positioned on one of said housing and said nozzle base, said final filter assembly being in fluid communication with said suction source exhaust outlet for filtering said suction airstream exhausted from said suction source exhaust outlet and for discharging said suction airstream into the atmosphere.

7. The vacuum cleaner as set forth in claim 6 wherein said final filter assembly comprises a high efficiency particulate arrest (HEPA) filter media.

8. A vacuum cleaner comprising:

a housing defining a cyclonic airflow chamber for separating contaminants from a suction airstream, said housing further comprising a suction airstream inlet and a suction airstream outlet in fluid communication with said cyclonic airflow chamber, wherein a lower portion of said cyclonic airflow chamber is defined by a dirt container for receiving and retaining dirt and dust separated from said suction airstream, said container being pivotable between an operative position and an open position, and including an open upper end defined by an inclined edge such that when said dirt container is pivoted fully into the open position, the inclined edge is located in a substantially horizontal plane to inhibit spillage of the separated dirt and dust;

a nozzle base including a main suction opening, said main suction opening being fluidically connected with said cyclonic airflow chamber inlet;

an airstream suction source having an inlet fluidically connected to said cyclonic airflow chamber outlet and a suction source exhaust outlet, said suction source selectively establishing and maintaining a suction airstream from said nozzle main suction opening to said suction source exhaust outlet;

a main filter assembly positioned in fluid communication between said cyclonic airflow chamber and said suction source for filtering residual contaminants from said suction airstream downstream relative to said cyclonic airflow chamber, said main filter assembly comprising a filter element including high-density polyethylene porous filter media.

9. An upright vacuum cleaner comprising:

an upright housing section including a handle;

a nozzle base section hingedly interconnected with the upright housing section, said nozzle base section including a main suction opening formed in an underside thereof;

a cyclonic airflow chamber defined in said upright housing section for separating dust and dirt from a suction airstream;

a suction source located in one of said upright housing section and said nozzle base section and having a suction airflow inlet in fluid communication with said cyclonic chamber and a suction airflow outlet;

a main filter assembly located in said cyclonic chamber and including a rigid filter element for filtering residual dust and dirt from a suction airstream as said suction airstream exits said cyclonic airflow dust and dirt separating chamber, said filter element comprising rigid, porous high-density polyethylene filter media; and a final filter assembly located on one of said housing and said nozzle base, said final filter assembly being connected in fluid communication with said suction airflow outlet of said suction source for filtering said suction airstream exhausted by said suction source prior to said suction airstream being dispersed into the atmosphere.

10. The upright vacuum cleaner as set forth in claim 9 wherein said final filter assembly comprises a high efficiency particulate arrest (HEPA) filter media.

11. The upright vacuum cleaner as set forth in claim 9 wherein said porous filter media has pores with an average pore size of less than approximately 90 $\mu$m.

12. An upright vacuum cleaner comprising:

an upright housing section including a handle;

a nozzle base section hingedly interconnected with the upright housing section, said nozzle base section including a main suction opening formed in an underside thereof;

a cyclonic airflow chamber defined in said upright housing section for separating dust and dirt from a suction airstream;

a suction source located in one of said upright housing section and said nozzle base section and having a suction airflow inlet in fluid communication with said cyclonic chamber and a suction airflow outlet;

a main filter assembly located between said cyclonic chamber and said suction source for filtering residual dust and dirt from a suction airstream after said suction airstream passes through said cyclonic airflow dust and dirt separating chamber, said main filter assembly including a porous high-density polyethylene foam main filter element having a convoluted outer surface that defines at least a first elongated inner filter section and a second elongated filter section, wherein said first and second filter sections are separated by a deep airflow passage; and, a final filter assembly located on one of said housing and said nozzle base, said final filter assembly being connected in fluid communication with said suction airflow outlet of said suction source for filtering said suction airstream exhausted by said suction source prior to said suction airstream being dispersed into the atmosphere.

13. The upright vacuum cleaner as set forth in claim 12 wherein a lower portion of said cyclonic airflow chamber is defined by a dirt container for receiving and retaining dirt and dust separated from said suction airstream, said container being pivotable between an operative position and an open position and including an open upper end defined by an inclined edge such that when said dirt container is pivoted fully into the open position, the inclined edge is located in a substantially horizontal plane to inhibit spillage of the separated dirt and dust.

14. A vacuum cleaner comprising:

a nozzle section;

a housing section connected to said nozzle section and in fluid communication with said nozzle section;

a cyclonic airflow chamber located in said housing section for separating dirt and dust from a suction airstream flowing into said housing section between an inlet located at a periphery of said housing section and an outlet located at an apex of said housing section;

a filter chamber located in said housing section between said cyclonic airflow chamber and said outlet of said housing section, said filter chamber comprising:

a first filter housing, and a first filter element mounted in said first filter housing, wherein said first filter element and said first filter housing cooperate to define a tortuous flow path for air flowing from said cyclonic airflow chamber to said outlet of said housing section, said first filter element defining at least a first elongated inner filter section and a second elongated filter section, wherein said first and second filter sections are separated by an annular airflow passage.

15. The vacuum cleaner as set forth in claim 14 wherein said first filter element comprises high density polyethylene porous filter media having an average pore size of approximately 45 μm to approximately 90 μm.

16. A vacuum cleaner comprising:

a nozzle section;

a housing section connected to said nozzle section and in fluid communication with said nozzle section, said housing section further comprising a dirt container for receiving and retaining dirt and dust separated from said suction airstream, said container being pivotable between an operative position and an open position and including an open upper end defined by an inclined edge such that when said dirt container is pivoted fully into the open position, the inclined edge is located in a substantially horizontal plane to inhibit spillage of the separated dirt and dust;

a cyclonic airflow chamber located in said housing section for separating dirt and dust from a suction airstream flowing into said housing section between an inlet located at a periphery of said housing section and an outlet located at an apex of said housing section;

a filter chamber located in said housing section between said cyclonic airflow chamber and said outlet of said housing section, said filter chamber comprising:

a first filter housing, and a first filter element mounted in said first filter housing, wherein said first filter element and said first filter housing cooperate to define a tortuous flow path for air flowing from said cyclonic airflow chamber to said outlet of said housing section.

17. The vacuum cleaner as set forth in claim 16 further comprising:

a main suction opening located in said nozzle section and connected to a suction airstream inlet of said cyclonic chamber; and, a suction source connected to said outlet of said housing section for suctioning an airstream from said nozzle main suction opening into and through said cyclonic chamber to an exhaust outlet of said suction source.

18. The vacuum cleaner as set forth in claim 17 further comprising a second filter chamber connected to said exhaust outlet of said suction source and a second filter element for filtering contaminants from said airstream exhausted by said suction source.

19. The vacuum cleaner as set forth in claim 18 wherein said second filter element comprises high efficiency particulate arrest filter media.

20. The vacuum cleaner as set forth in claim 18 wherein said first filter element includes a convoluted outer surface.

* * * * *